Patented Aug. 26, 1941

2,254,072

UNITED STATES PATENT OFFICE 2,254,072

PRINTING PROCESS

John D. Jenkins, Wilkinsburg, Pa., assignor to Pittsburgh Plate Glass Company, Allegheny County, Pa., a corporation of Pennsylvania No Drawing. Application October 5, 1939, Serial No. 298,054

9 Claims. (Cl. 101—426)

The present invention relates to inks, and notably to the inks of the type employed in printing operations.

One object of the invention is to provide an ink composition which dries or hardens rapidly, does not penetrate the paper to an excessive degree, adheres readily to paper or other surfaces, is sufficiently fluid for application, even when containing large percentages of vehicle, does not dry or harden prematurely and is inexpensive to manufacture.

A second object of the invention is to provide a process which may be employed either initially to formulate an ink possessing the foregoing characteristics, or which may be employed to impart desired characteristics to an existent ink.

Inks, notably those employed in making impressions in printing operations, are of a number of different types. However, most of them embody a pigmentary substance such as color lakes, carbon black, powdered metals, i. e., bronze or aluminum, or the like, suspended in a fluid vehicle which is designed to dry by molecular interlinkage or by solvent evaporation, or otherwise to harden, to provide an adhesive binder designed to coat the pigment and to bond it to the surface upon which the impressions are made.

One very common vehicle for printing inks comprises as its main film-forming ingredient vegetable oils, notably the drying oils, such as linseed, which upon application to paper and subsequent exposure to heat and light oxidize and harden without evaporation to form a coherent and adherent body, which provides a matrix for the pigmentary particles and bonds them to the paper, fabric or other material.

A second type of vehicle for inks embodies a soluble plastic material of the type of nitrocellulose, coumarone resins, phenolic resins and alkyd resins, dissolved in a volatile solvent medium in order to render it sufficiently fluid for printing operations.

The latter type of ink hardens by evaporation of the solvent to leave the pigment particles embedded in a matrix of plastic. In some instances these two main types of vehicles have been combined to include both the vegetable oil and the plastic material in a single composition.

Inks preferably should be fairly fluid to facilitate operations, but should contain considerable amounts of solid or solid-forming material in order to provide a film of adequate body when impressed upon a receiving surface. They should adhere to, but not unduly penetrate, the paper or other backing, else excessive spreading and blocking may occur. Likewise the binder must provide sufficient bond to prevent pigment from being rubbed off unduly readily. The ink vehicle when applied must dry or set quickly in order to admit of rapid production. At the same time it must not set up prematurely to cause clogging of the types or plates carrying the impressions or the fonts containing the ink.

Many of these properties are substantially in antithesis to each other. For example, high fluidity normally necessitates relatively low solids content. Inks that rapidly dry after application are most likely to harden on the type or in the ink fonts.

The present invention involves the discovery that very finely-divided plastic materials, notably those possessing thermoplastic characteristics may be suspended in solid state in ink compositions to provide materials which are of high fluidity, yet contain high percentages of solids; which dry or harden very quickly at slightly elevated temperatures and yet do not dry on the presses.

The finely-divided or pulverulent plastic materials may be simply added to an existent or preformed ink for purposes of improving the characteristics thereof, or the powders may be dispersed along with pigmentary materials in a suitable non-solvent medium in order directly to provide an ink body suitable for replacing conventional inks.

Pulverulent plastic or resinous materials suitable for use in the practice of the present invention may be obtained by various methods. One method, of course, involves simple mechanical attrition or grinding of a plastic or resinous body. However, this method is not always entirely satisfactory, because of difficulty in grinding plastic bodies, notably the more or less rubbery plastic material such as the vinyl acetals, the copolymers of vinyl acetate and vinyl chloride, acrylate resins and the like. A preferable method of obtaining sufficient pulverulence involves precipitation of the resins or plastic from a solvent. One such method disclosed in British Patent 498,396 involves precipitation of polyvinyl acetal resins by high speed dispersion of a solution of the resin dissolved in chloroform or methylene chloride in water containing a dispersing agent, such as sodium, butyl naphthalene sulfonate and removal of the solvent by steam distillation. A further method disclosed in German Patent 670,212 involves dissolving the resin in a liquid under pressure which liquid is gaseous at ordinary temperatures and then eliminating the solvent. Sulfur dioxide and methylene chloride are suggested for the purpose.

A highly satisfactory method involves the addition of a non-solvent to a solution of resin approximately to the point of incipient precipitation of the resin. Subsequently, the solution is chilled to effect gellation and is then agitated to break up the gel and to cause separation of the solvent therefrom by syneresis. The fluids, including the resin solvent, may then be washed out or diluted by means of a non-solvent to such degree as to obviate any tendency of the pulverulent resin to pass back into solution when the temperature is permitted to rise. The following is a specific example illustrating an application of the method to the formation of a very fine powder of the copolymer of vinyl chloride and vinyl acetate.

A solution was prepared by dissolving in 900 parts of acetone under agitation at room temperature, 100 parts of the copolymer of 87 parts of vinyl chloride and 13 parts of vinyl acetate. To this solution under agitation were added 320 parts of 88% isopropanol. Particles of resin precipitated during this addition but redissolved readily upon continued agitation. There resulted a slightly hazy but very fluid solution which was gradually cooled. At 5° C., the solution had become very hazy and quite viscous. At —4° C. the resin precipitated in very finely divided form to yield a fluid suspension. Cooling to —40° C. brought no further change in the appearance of the suspension. An additional 700 parts of 88% isopropanol were added at —40° C. and immediately thereafter 1500 parts of water were added, raising the temperature to —24° C. The charge was then dropped into 7000 parts of water at room temperature. After filtering and drying, less than 2% of the powder failed to pass a 200 mesh sieve.

It is to be understood that the preparation of powders is not limited to the process disclosed, or to the specific plastics referred to. Many other plastics may also be prepared in pulverulent form by the same or by different methods. The following table constitutes a partial list of some of the more important substances which in the pulverulent form may be added to an existent ink formula, or suspended with pigments in a nonsolvent liquid to provide a new ink:

Table

Nitrocellulose
Cellulose acetate
Cellulose acetopropionate or butyrate
Ethyl cellulose
Straight phenolic or Bakelite resins (in B state of polymerization)
Urea-formaldehyde resins
Vinyl acetate polymer
Vinyl chloride polymer
Partial polyvinyl acetal of butyral
Copolymer of vinyl chloride and vinyl acetate
Chlorinated rubber
Methyl methacrylate resin
Shellac
Manila gum
Styrene resin
Coumarone-indene resin It is to be understood that these may be incorporated into ink formulae embodying any suitable pigmentary material such as lamp black or powdered metals, such as bronze powder, powdered aluminum and the like.

It, of course, is essential that the vehicle into which the pulverulent plastic is added be substantially a non-solvent for the specific plastic. In most instances the pulverulent plastic may be added to inks embodying drying oils or to drying oils diluted with mineral spirits, turpentine or the like as a vehicle, without solution. Examples of suitable vehicles which may be combined with pulverulent resins include lithographic oil, such as bodied or unbodied linseed oil, soya bean oil, etc.

A second type of vehicle would comprise a varnish containing a volatile thinner such as kerosene, or the high or low boiling mineral spirits, or the like in which was dissolved a resin such as phenolic resin of the modified type, i. e., a resin modified with drying oil and-or ester gum. A third type would involve a varnish containing a volatile thinner in which was dissolved an alkyd resin modified with glyceride oils or fatty acids from glyceride oils. Pulverulent resins may be added to inks embodying any other resins in solvents which are non-solvents for the specific pulverulent material.

The following constitutes a specific example of a formulation of ink comprising pulverulent resins:

Example I

| | Per cent |
|---|---|
| Ester gum | 14 |
| Vinylite H (powdered) | 16 |
| Lamp black | 15 |
| Kerosene | 55 |
| | 100 |

A pulverulent plastic such as partial polyvinyl butyral or any of the others listed in the table, which are insoluble in this composition in an appropriate amount, for example 5 to 20 parts may be added to 100 parts of this mixture after it is formed, by simple grinding or milling. The resins may also be incorporated into the solvent, or varnish, prior to the addition of the lamp black. A further variation would involve admixture of the pulverulent resin or plastic with black, with the subsequent incorporation of these as a dispersion in the solvent for the ester gum.

The addition of the pulverulent plastic in amounts up to 20 or 30% is often found to be accompanied by improvements in the dispersion of the pigmentary body in the vehicle and a substantial lowering of the viscosity of the ink. This is an unexpected phenomenon and it is of substantial advantage because it admits of reduction of the percentage of volatile solvents or thinners in the ink without a corresponding increase in the viscosity thereof.

The pulverulent plastic may be added to the ink composition by milling or other appropriate method.

Inks including that in the preceding examples or the other examples herein given and comprising a pigmentary body, a vehicle and a pulverulent resin dispersed therein may be applied to paper, cloth or any other suitable backing body travelling at high speeds, e. g. 600 feet or more per minute, by conventional printing operations, for example with types or engraved or etched plates. Subsequently heat is applied to the web or sheet carrying the impressions in order to evaporate the solvents and to promote softening or fusion of the resin. The temperature should not be so high as to produce charring of the sheet, but it may be of the order of 100 to 300° F. with comparative safety. Of course, flash heating by radiant bodies is contemplated. It would appear that some of the solvents are eliminated through the sheet medium which usually is more or less of porous nature. Some of the remaining diluents doubtless are evaporated and if desired may be recovered. However, it would appear that at elevated temperatures the diluents act as partial solvents for the pulverulent resin and are taken up by the latter. This absorption of the solvent of course promotes rapid drying of the ink and also effects a plasticization of the pulverulent plastic which assists in the bonding together of the particles to form a coherent film.

If preferred sheet media receiving the impressions in the printing operations may be exposed to vapors of solvents for the pulverulent resins. Such vapors assist in softening the resin particles and produces a bonding action between the particles at a lower temperature than would otherwise be permissible.

Another ink composition containing a pulverulent resin may be formulated as follows:

Example II

|  | Percent |
| --- | --- |
| Cumar | 10 |
| Rosin oil | 5 |
| Vinylite H (powdered) | 20 |
| Lamp black | 10 |
| Turpentine | 55 |

Example III

|  | Parts |
| --- | --- |
| Nitrocellulose (½ second) | 10 |
| Ester gum | 25 |
| Xylol | 30 |
| Fenchone | 30 |
| Dibutyl phthalate | 5 |
| Pigment (80% lithepone 20%, zinc oxide) | 25 |

To the foregoing ink may be added 10 to 75 parts of highly pulverulent cellulose acetate.

Example IV

|  | Parts |
| --- | --- |
| Chrome yellow | 100 |
| Nitrocellulose (low viscosity) | 35 |
| Diethylene glycol monobutyl ether | 55 |
| Dibutyl phthalate | 10 |
| Brown castor oil | 10 |

To this composition were added 10 to 60 parts of very finely-divided cellulose acetate.

Example V

To an ink containing a drying alkyd resin as disclosed in British Patent 337,199 may be dispersed 10 to 75%, based on total solids content, of a pulverulent resin which is insoluble therein. An example of such pulverulent resin would be the copolymer of polyvinyl acetate and vinyl chloride. The ink may be applied by conventional printing operations and dried and hardened by heat.

Vehicles embodying linseed oil or other vegetable oil may be substituted for or added to solutions of plastic materials.

Example VI

About 20 parts of lamp black or 50 parts of bronze blue may be dispersed in lithographic oil and to this oil may be added 10 to 50% of an insoluble pulverulent resin, such as ethyl cellulose. The resin may be dry or dispersed in turpentine or other suspending medium which is soluble in the oil.

It will be evident that a pulverulent resin and a pigment such as carbon black or powdered bronze or aluminum may be added to a non-solvent for the resin in appropriate amounts to form a new printing ink.

Example VII

|  | Percent |
| --- | --- |
| Carbon black | 4 |
| Ethyl cellulose powder | 25 |
| Medium lithographic oil | 7 |
| Dibutyl phthalate | 3 |
| Kerosene | 51 |
|  | 100 |

Such ink when applied by printing to paper, or to fabrics such as cotton, rayon, linen, silk, wool or the like soon looses its non-solvent by absorption into the surface and by evaporation. The particles of plastic may be coalesced and evaporation of non-solvent expedited by application of heat. Vapors or sprays of solvents may also be applied in order to promote coalescence of the particles.

The pulverulent resins in many of the examples may or may not include a plasticizer. An excellent method of incorporating plasticizers with such pulverulent materials involves suspending the resin in a medium which is a non-solvent for the resin, but is a solvent for the plasticizer. A suspension of plastic dispersed in a non-solvent, in which is dissolved a plasticizer may be added to an existent ink as above described, or to such suspension may be added a pigmentary body herein described, in order initially to form an ink.

Example VIII

|  | Percent |
| --- | --- |
| Nitrocellulose (finely powdered) | 30 |
| Diester of phthalic acid and the monobutyl ether of ethylene glycol | 10 |
| Bodied linseed oil | 60 |

Example IX

|  | Percent |
| --- | --- |
| N-butyl methacrylate | 10 |
| Mineral spirits | 44 |
| Toluene | 1 |
| Dibutyl phthalate | 15 |
| Vinylite H (powdered) | 30 |
|  | 100 |

The suspensions in Examples VIII and IX may be admixed with pigments such as carbon black or powdered bronze to obtain a suitable tint. The carbon black may be used in an amount of about 10 to 20%, based on total vehicle content. The powdered bronze may be used in amounts for example of about 50%.

Soluble plastics such as alkyd resins may be dissolved in the suspensions containing plasticizers in amounts of about 10 to 50% on the basis of solids content.

It is also possible to incorporate considerable amounts of the suspensions containing dispersed solid resin and dissolved plasticizer into existent ink formulae to improve the characteristics thereof. Thus in Example I about 10 to 30 parts of pulverulent cellulose nitrate or a copolymer of vinyl acetate and vinyl chloride along with 10 to 50% on the basis of plastic content of a compatible plasticizer, such as dibutyl phthalate or tricresyl phosphate may be added to the ester gum solvent. To the terpineol of Example II may be added 10 per cent and upward upon the basis of solids content of cellulose acetate plasticized with 10 to 50% of dimethyl phthalate.

Example X

| | Parts |
|---|---|
| Carbon black | 10 |
| Drying oil—phenol resin modified alkyd resin solution (Beckasol #1) | 65 |
| Kerosene | 5 |
| Ethyl cellulose powder | 10 |
| | 90 |

Example XI

| | Parts |
|---|---|
| Carbon black | 10 |
| Drying oil modified alkyd resin solution (Rezyl 110) | 45 |
| Mineral spirits | 35 |
| Ethyl cellulose powder | 10 |
| | 100 |

Example XII

| | Parts |
|---|---|
| Carbon black | 10 |
| Short oil Bakelite, Chinawood oil varnish (12½ gal. length) | 30 |
| Kerosene | 30 |
| Vinylite H resin powder | 15 |
| | 85 |

The examples are to be considered only as exemplary. Numerous changes may be made therein without departure from the spirit of the invention or the scope of the claims.

What I claim is:

1. A process of printing with an ink comprising a coloring material, a binder and a solvent for the binder, the steps of adding to the ink a powdered plastic material which is insoluble in the ink solvent at press room temperatures and which becomes at least partially soluble in the ink solvent at elevated temperatures, in an amount insufficient to make the ink too viscous to apply by a conventional printing operation, making an imprint with the ink on a suitable surface, heating the whole surface to a temperature sufficient to absorb at least a part of the solvent in the powder to incorporate therein a part of the ink solvent to materially assist the formation of a non-smudging imprint on the surface upon cooling of the ink with the part of the solvent united at least temporarily with the plastic material.

2. A process as defined in claim 1 in which a finely-divided plastic is a cellulose ether.

3. A process as defined in claim 1 in which the binder is a resin in solution in a solvent.

4. A process as defined in claim 1 in which the binder comprises a drying oil.

5. A process as defined in claim 1 in which the plastic in finely-divided form is a vinyl resin.

6. A process as defined in claim 1 in which the plastic in finely-divided form is a copolymer of vinyl acetate and vinyl chloride.

7. A process of printing with an ink comprising a coloring material and a liquid medium, the steps of adding to the ink a powdered plastic material which is insoluble in the medium at press room temperatures and which becomes at least partially soluble in the medium at elevated temperatures, in an amount insufficient to make the ink too viscous to apply by a conventional printing operation, making an imprint with the ink on a suitable surface, heating the whole surface to a temperature sufficient to absorb at least a part of the medium in the powder to incorporate therein a part of the medium to materially assist the formation of a non-smudging imprint on the surface upon cooling of the ink with the part of the medium united at least temporarily with the plastic material.

8. A process as defined in claim 7 in which the powdered plastic material is selected from a group consisting of cellulose ether, vinyl acetate, polyvinyl acetal and the co-polymer of vinyl acetate and vinyl chloride.

9. A process as defined in claim 7 in which the liquid medium comprises a drying oil.

JOHN D. JENKINS.